Feb. 21, 1961 M. E. REINECKE ET AL 2,972,246
CHROMATOGRAPHIC ANALYZER
Filed May 19, 1958 3 Sheets-Sheet 1

INVENTORS
M.E. REINECKE
EMMERICH GUENTHER
BY
*Hudson & Young*
ATTORNEYS

INVENTORS
M.E. REINECKE
EMMERICH GUENTHER
BY Hudson & Young
ATTORNEYS

United States Patent Office
2,972,246
Patented Feb. 21, 1961

2,972,246
CHROMATOGRAPHIC ANALYZER

Marvin E. Reinecke and Emmerich Guenther, Bartlesville, Okla., assignors to Phillips Petroleum Company, a corporation of Delaware Filed May 19, 1958, Ser. No. 736,297

7 Claims. (Cl. 73—23)

This invention relates to the analyses of fluid streams by means of elution chromatography. In another aspect it relates to rotary selector valves.

In various industrial and laboratory operations, there is a need for analysis procedures which are capable of measuring small concentrations of constituents in fluid mixtures. One analysis procedure which presently is becoming quite valuable for fluid analysis involves elution chromatography. In elution chromatography, a sample of the material to be separated is introduced into a column which contains a selective adsorbent. A carrier gas is directed into the column so as to tend to force the sample material through the column. The adsorbent attempts to hold the constituents of the sample, whereas the stripping gas tends to pull them through the column. This results in the several constituents of the fluid mixture traveling through the column at different rates of speed, depending upon their affinities for the packing material. The column effluent thus consists initially of the carrier gas alone, the individual constituents of the fluid mixture appearing at later spaced time intervals. It is common practice to detect these constituents by means of a thermal conductivity analyzer which compares the thermal conductivity of the effluent gas with the thermal conductivity of the carrier gas directed to the column.

In many applications of these chromatographic analyzers, it is desirable to make individual analyses as often as possible. Since the time required to purge a column following an analysis is often much greater than the actual analysis time, it is proposed to employ a plurality of columns. In accordance with the present invention, a novel programmed sampling system is provided wherein samples to be analyzed are passed in sequence to a plurality of chromatographic columns. A purge gas is directed through the remaining columns to prepare them for subsequent analyses. A novel rotary valve system is provided for introducing the sample fluid, the carrier gas and the purge gas into the columns in a preselected sequence. The valve system comprises a pair of rotary valves which are driven by a motor that is actuated periodically by means of a programming device.

Accordingly, it is an object of this invention to provide a novel analysis system employing a plurality of chromatographic analyzer columns.

Another object is to provide a programmed valve control system to introduce a sample stream to be analyzed into a plurality of chromatographic columns in sequence.

A further object is to provide improved rotary valves.

Other objects, advantages and features of this invention should become apparent from the following detailed description which is taken in conjunction with the accompanying drawing in which.

Figure 1:
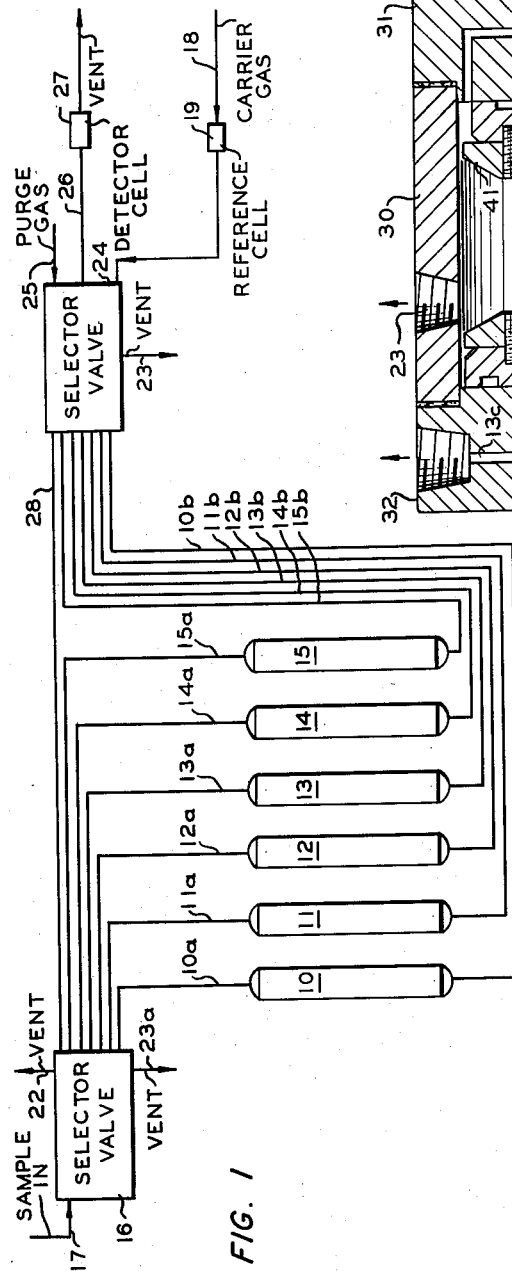
Figure 1 is a schematic representation of the analyzer of this invention.
Figure 3:
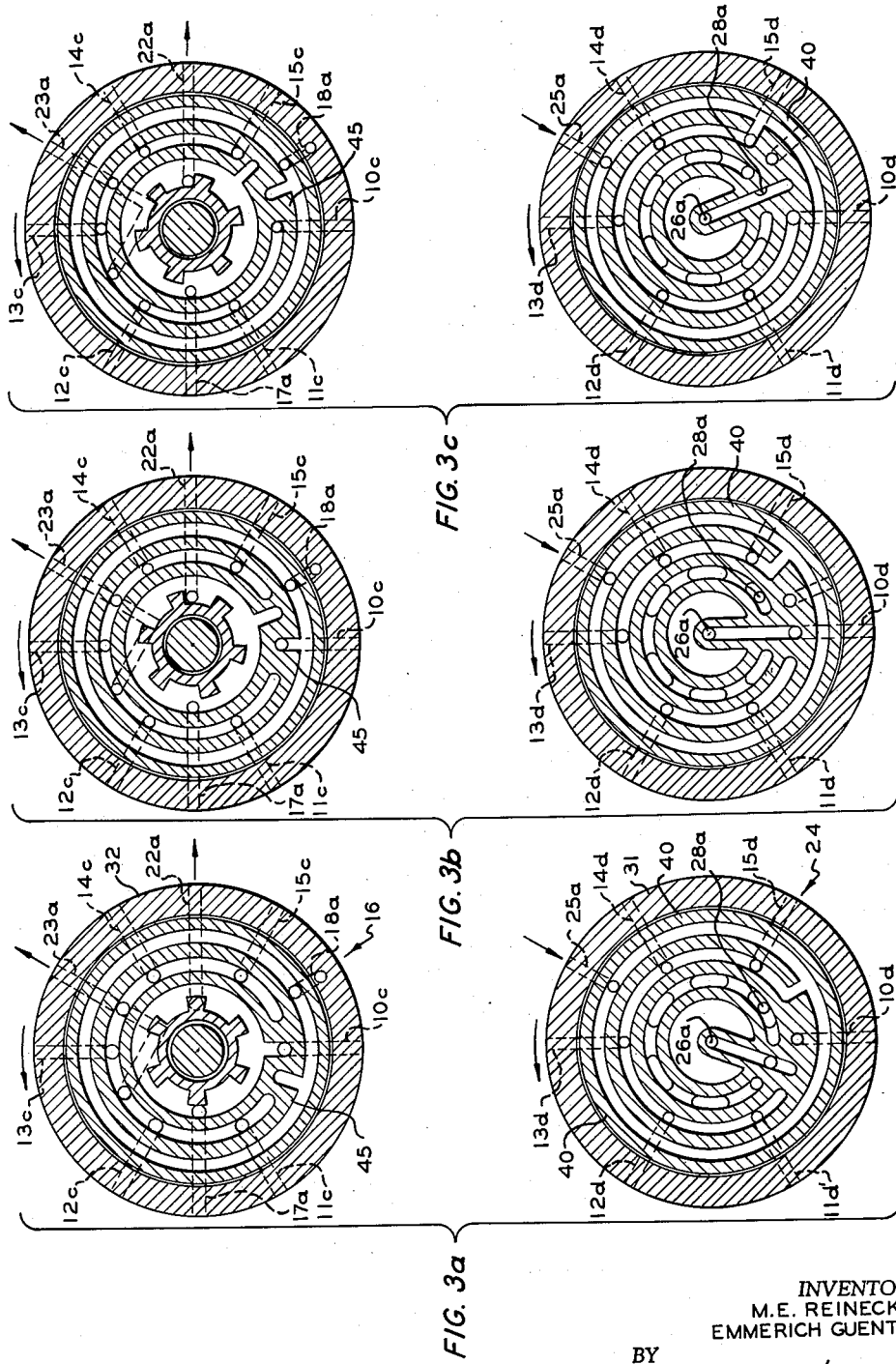

Figures 3a, 3b, and 3c, illustrate sequential positions of the selector valves of Figure 1.

Figure 4:
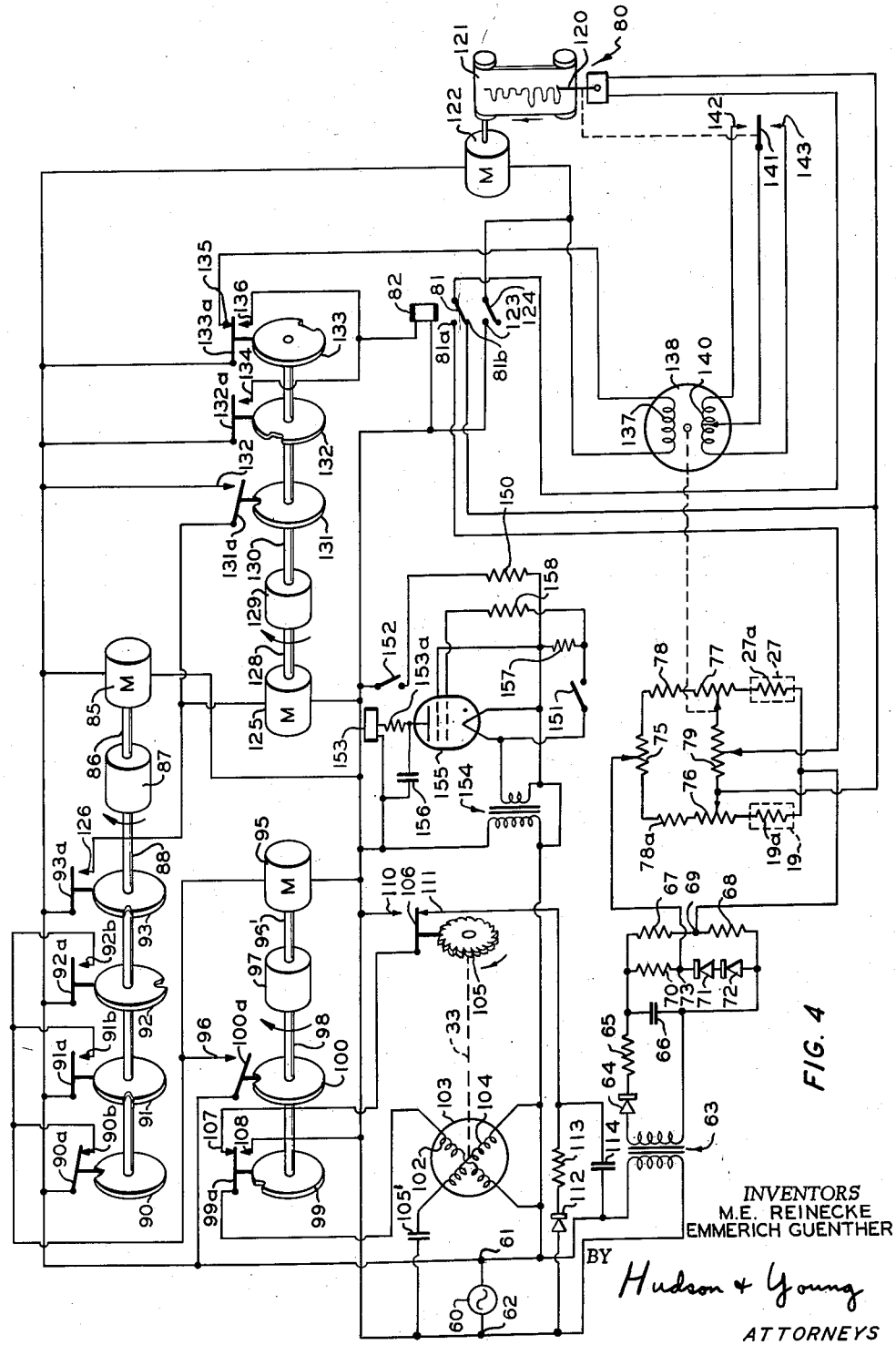

Figure 4 is a schematic circuit drawing of the detecting circuit and the programmer which operates the selector valves of Figure 1.

Referring now to the drawing in detail and to Figure 1 in particular, there are shown a plurality of columns 10, 11 12, 13, 14 and 15 which contain material or materials that selectively retards the passage therethrough of the constituents of a fluid mixture to be analyzed. These columns can be filled with an adsorption material, such as a molecular sieve material comprising a dehydrated zeolite, silica gel, alumina, or an inert crushed solid coated by a solvent such as hexadecane or benzyl ether. Any material which selectively retards passage of the constituents of a fluid mixture to be analyzed can be employed as the packing material in these columns. For some analyses, the columns can contain two different materials in separate zones. The inlet zone can contain an adsorbent which provides a frontal analysis, the least retarded constituents appearing first in the effluent. The second zone functions as a conventional elution chromatographic column to separate the first constituents in the effluent from the first zone. The inlets of columns 10 to 15 are connected by respective conduits 10a, 11a, 12a, 13a, 14a and 15a to respective outlets of first selector valve 16. A fluid sample to be analyzed is introduced into an inlet port of selector valve 16 through a conduit 17. A flow controller and a pressure regulator, not shown, can be positioned in conduit 17. Vent conduits 22 and 23 communicate with respective outlet ports of selector valve 16.

The outlet ports of columns 10 to 15 are connected by respective conduits 10b, 11b, 12b, 13b, 14b, and 15b to respective inlet ports of a second selector valve 24. A carrier gas is introduced into an inlet port of valve 24 through a conduit 18 which has a reference analyzer cell 19 disposed therein. A flow controller and pressure regulator can also be positioned in conduit 18. Examples of carrier gases which can be employed include helium, hydrogen, nitrogen, argon, air and steam. The particular carrier gas employed and the particular material employed in the columns depend to a large extent upon the composition of the sample material to be analyzed. Reference cell 19 preferably is a thermal conductivity cell which comprises a thermistor deposited in thermal contact with the carrier gas. A purge gas, which can be the same as the carrier gas, is introduced into selector valve 24 through a conduit 25. A flow controller and pressure regular can also be positioned in conduit 25. The outlet of selector valve 24 communicates with a conduit 26 which has a second detector cell 27 disposed therein. A conduit 28 communicates directly between selector valves 16 and 24.

In order to describe the operation of the analyzer of this invention reference is made to an analysis of a fluid mixture comprising ethylene methane and carbon monoxide in order to determine the concentration of carbon monoxide. Each of the columns 10 to 15 was approximately 15 feet long and had an internal diameter of approximately ¼ inch. A molecular sieve material comprising a dehydrated zeolite of 16/20 mesh was positioned in the first 9 feet of the columns and 60/80 mesh activated charcoal was positioned in the last 6 feet. A carrier gas, helium, was introduced into the system through conduit 18 at a rate of approximately 30 cubic centimeters per minute. The purge gas, also helium, was introduced into the system through condiut 25 at a rate of approximately 500 cubic centimeters per minute. The fluid mixture to be analyzed was introduced into the system through conduit 17 at a rate of approximately 100 cubic centimeters per minute.

At a first point in the analyzer cycle, it is assumed that column 10 has been purged for a period in excess of two and one-half hours by the passage of purge gas therethrough from conduit 25. It is also assumed that this purge gas is flowing through columns 11 to 15 and is being vented from the system through conduit 23. Selector valve 16 is positioned initially so that carrier gas from conduit 18 flows through cell 19 and is vented through conduit 26. Sample inlet conduit 17 communicates with conduit 10a to introduce the sample mixture into column 10. This portion of the cycle continues for approximately eight minutes which results in approximately one-half of the molecular sieve portion of the packing material in column 10 being saturated by the sample mixture and the beginning of a frontal type analysis as the ethylene pushes the trace components, methane and carbon monoxide, ahead of it. Selector valve 16 is then actuated so that the sample mixture is vented through conduit 22 and the carrier gas from conduit 18 is introduced into column 10 throuh conduits 28 and 10a. Conduit 10b is connected through selector valve 24 to outlet conduit 26. This portion of the cycle continues for approximately five minutes, during which time the carrier gas elutes the carbon monoxide from column 10 because carbon monoxide is less readily adsorbed by the charcoal than the methane. The difference in thermal conductivity between the effluent gas and the carrier gas introduced into the system at this time represents the concentration of carbon monoxide in the sample being analyzed. At the end of this five minute period, the selector valves are actuated so that the carrier gas once again by-passes the columns by being passed directly through detector 27 to vent. A portion of the purge gas is directed into column 10 from conduit 10b. This continues for 17 minutes, after which time the selector valves are again actuated so that the sample is introduced into column 11 and the flow of purge gas through column 11 is terminated. The above described cycle then repeates for column 11 and for each additional column in sequence, the total cycle requiring approximately three hours. Thus, during a three hour period, six complete analyses of the sample material are made.

Figure 2:
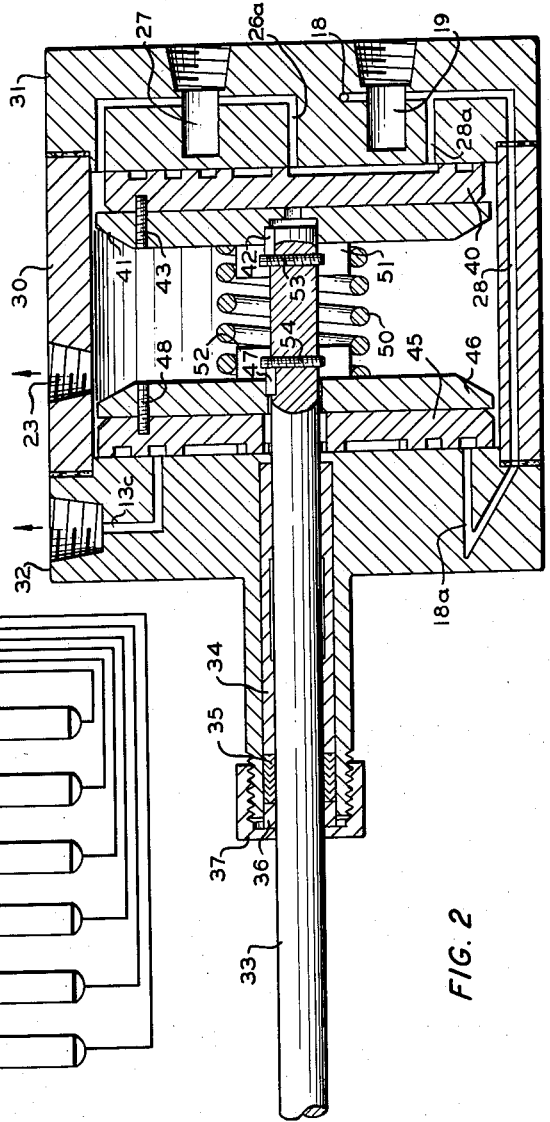
Figure 2 is a view, shown partly in section, of the selector valves employed in the analyzer of Figure 1.

Selector valves 16 and 24 are illustrated in Figures 2, 3a, 3b and 3c. With reference to Figure 2, the selector valves comprise a cylindrical housing 30 which is provided with respective end plates 31 and 32 that are secured thereto by suitable bolts or screws, not shown. Cells 19 and 27 are disposed in end plate 31. A rotatable shaft 33 extends into housing 30 and is supported by means of a sleeve 34 which is carried by end plate 32. Shaft 33 is sealed within end plate 32 by means of packing material 35 which is held in place by a sleeve 36 that is attached to plate 32 by a cap 37. A first valve plate 40 is attached to shaft 33 to rotate therewith by means of a backing plate 41 which is secured to shaft 33 by a key 42. A pin 43 secures plate 40 to plate 41 so that the two plates rotate together when shaft 33 is rotated. Plate 41 is free to move longitudinally of shaft 33. A second valve plate 45 is secured to shaft 33 by means of a backing plate 46 which is attached to shaft 33 by a key 47. A pin 48 extends between plates 45 and 46. Backing plate 46 is also free to move longitudinally of shaft 33. A compression spring 50 is disposed between backing plates 41 and 46 so as to retain plates 40 and 45 in engagement with respective end plates 31 and 32. Spring 50 is retained in position by means of disks 51 and 52 which are attached to shaft 33 by respective pins 53 and 54. Rotation of shaft 33 thus rotates valve plates 40 and 45.

A plurality of passages are drilled in end plates 31 and 32 for the introduction and withdrawal of fluids. These passages terminate adjacent respective valve plates 40 and 45 which are provided with recesses in the faces thereof to permit selected passages to communicate with one another. These passages and recesses are illustrated in Figures 3a, 3b and 3c. With reference to the upper portion of Figure 3a, end plate 32 is provided with passages 10c, 11c, 12c, 13c, 14c and 15c which communicate at the outer ends with respective conduits 10a, 11a, 12a, 13a, 14a, 15a of Figure 1. The inner ends of these passages terminate at spaced points on a circular path adjacent valve plate 45. The shaded part of the upper part of Figure 3a represents the face of valve plate 45 which engages the face of end plate 32. The part not shaded represents the recesses in the face of plate 45. A passage 17a is formed in end plate 32 to introduce sample fluid into a region adjacent valve plate 45. A vent passage 22a is likewise formed in end plate 32. These two passages are connected at their outer ends with respective conduits 17 and 22 of Figure 1. A passage 18a is formed in end plate 32 so that the carrier gas from conduit 18 can be introduced into a region adjacent valve plate 45. A vent passage 23 in end plate 32 communicates at two points adjacent valve plate 45.

In the lower portion of Figure 3a there is shown the corresponding structure of end plate 31 and valve plate 40. A plurality of passages 10d, 11d, 12d, 13d, 14d and 15d communicate between regions exterior of plate 31 and spaced points on a circular path adjacent valve plate 40. The outer ends of these passages communicate with respective conduits 10b, 11b, 12b, 13b, 14b and 15b of Figure 1. A passage 26a communicates between a region adjacent the face of plate 31 and detector cell 27. A passage 28a extends through plate 31 and communicates at its outer edge with conduit 28 of Figure 1. This passage also communicates with a region in plate 31 adjacent valve plate 40.

From an inspection of Figure 3a, it can be seen that the sample material introduced through passage 17a is removed from valve 16 through passage 10c so as to be introduced into column 10 of Figure 1. The carrier gas is introduced through passage 18, flows through cell 19, and then through detector cell 27. The purge gas enters valve 24 through passage 25a and is removed through passages 11d, 12d, 13d, 14d and 15d. After flowing through the corresponding columns of figure 1, the purge gas is vented through passage 23 of valve 16.

At the end of the eight minutes previously mentioned, the valve plates are rotated counterclockwise approximately 20° to the positions shown in Figure 3b. At the end of five additional minutes, the valve plates are rotated an additional 20° counterclockwise to the positions shown in Figure 3c. From an inspection of these two figures it can be seen that the illustrated valve positions provide the flows previously described. An additional rotation of 20° in a counterclockwise direction results in the sample material being introduced into column 11. Each additional 60° of rotation initiates a new cycle for an adjacent column. It should thus be evident that a complete rotation of the valve plates results in the completion of one cycle of analyses by the six columns of Figure 1.

The detecting circuit of the analyzer and the programmer to operate the selector valves are illustrated in Figure 4. The entire circuit of Figure 4 is energized by a source of alternating current 60 which is connected between power terminals 61 and 62. The primary winding of a transformer 63 is connected between terminals 61 and 62. The first terminal of the secondary winding of transformer 63 is connected to the second terminal of this winding through a rectifier 64, a resistor 65 and a capacitor 66. Resistors 67 and 68 are connected in series relationship with one another and in parallel with capacitor 66. A resistor 70 and reference diodes 71 and 72 are also connected in series with one another and in parallel with capacitor 66. The junction between resistor 70 and reference diode 71 is designated as terminal 73. Alternating current from source 60 is thus rectified by rectifier 64 and filtered by resistor 65 and capacitor 66. The values of resistors 67, 68 and 70 and reference diodes 71 and 72 are selected so that a direct potential exists between terminals 73 and 69, terminal 73 being positive with respect to terminal 69. Terminal 69 is connected to the junction between thermistors 19a and 27a which are disposed in respective cells 19 and 27. The second terminal of thermistor 19a is connected to the first end terminal of a potentiometer 75 through a resistor 78a and a potentiometer 76. The second terminal of thermistor 27a is connected to the second end terminal of potentiometer 75 through a potentiometer 77 and a resistor 78. The contactor of potentiometer 75 is connected to terminal 73. A potentiometer 79 is connected between the contactors of potentiometers 76 and 77. The contactor and one end terminal of potentiometer 79 are connected to respective terminals 81a and 81b which are adapted to be engaged by a switch 81, the latter being actuated by a relay coil 82. Switch 81 and said one end terminal of potentiometer 79 are connected to a chart recorder 80.

It should be evident that this portion of the circuit of Figure 4 constitutes a modified form of Wheatstone bridge which functions to compare the resistances of thermistors 19a and 27a. The relative currents through the two arms of the bridge are established by potentiometer 75. The zero point of the bridge can be established by potentiometers 76 and 77. Potentiometer 79 serves to attenuate the output signal. The contactor of potentiometer 77 is mechanically connected to the drive shaft of a zero motor 138 which operates in the manner described hereinafter in detail. The bridge circuit is adjusted initially so that a zero potential is applied to recorder 80 when the composition of the gas flowing through detector cell 27 is the same as the composition of the gas flowing through reference cell 19.

In the example previously described, thirty minutes are required to complete the analysis by any one of the columns. A first constant speed motor 85 is connected across terminals 61 and 62. The drive shaft 86 of this motor is connected to the input of a gear train 87 which is of such configuration that the output shaft 88 makes one complete revolution in thirty minutes. Shaft 88 carries four cams 90, 91, 92 and 93. Switch arms 90a, 91a, 92a and 93a are associated with these cams so as to move downwardly when depressions in the respective cams are adjacent the switch arms. These switch arms are each connected to power terminal 61. Switch arms 90a, 91a, and 92a are adapted to engage respective terminals 90b, 91b, and 92b which are connected to the first terminal of a second constant speed motor 95 and to a terminal 96. The second terminal of motor 95 is connected to power terminal 62. The drive shaft 96' of motor 95 is connected to the inlet of a gear train 97 which is of such configuration that the output shaft 98 makes one complete revolution in one minute. Shaft 98 carries cams 99 and 100 which have respective switch arms 99a and 100a associated therewith. Switch arm 100a, which is connected to power terminal 61, engages terminal 96 when cam 100 is rotated such that the switch arm is not in the depression thereof. Switch arm 99a is connected to terminal 61 through the first coil 102 of a two-phase induction motor 103. The second coil 104 of motor 103 is connected in series with current source 60 and a capacitor 105'. The drive shaft 33 of motor 103 rotates valve plates 40 and 46 of Figure 2 and a disk 105 which is provided with eighteen notches in the periphery thereof. A switch arm 106 is engaged by disk 105. This switch arm is connected to a contact 107 which is engaged by switch arm 99a when the latter is not in the depression in cam 99. Switch arm 99a engages a terminal 108 when the switch arm is in the depression in cam 99. Terminal 108 is connected to power terminal 62. Switch arm 106 engages a terminal 110 momentarily each time disk 105 is rotated. Terminal 110 is connected to power terminal 62. Switch arm 106 engages a terminal 111 when disk 105 is stationary. A rectifier 112 and a resistor 113 are connected in series relationship between power terminal 62 and terminal 111. A capacitor 114 is connected between terminal 111 and power terminal 61.

At the beginning of the cycle, cam 90 is positioned so that switch arm 90a engages terminal 90b. This applies current to motor 95 to start rotation thereof. Rotation of cam 100 immediately moves switch arm 100a into contact with terminal 96 to insure that current is supplied to motor 95 until one revolution by shaft 98 is completed. Motor 95 thus remains energized through this connection even after contact between switch arm 90a and terminal 90b is broken. As soon as rotation of shaft 98 is commenced, switch arm 99a moves into engagement with terminal 108. This applies current to motor coil 102 to rotate motor 103. Motor 103 rotates shaft 33 approximately 20° to the position shown in Figure 3b. Prior to this time, a direct current path is completed from resistor 113 through terminal 111, switch arm 106, terminal 107, switch arm 99a and motor winding 102 to terminal 61. A direct potential thus exists previously across capacitor 114. As soon as motor 103 begins to turn, contact between switch arm 106 and terminal 111 is broken. At the end of 20° of rotation, switch arm 106 moves back into engagement with terminal 111 so that a direct current pulse is applied to motor winding 102 to terminate rotation of this motor abruptly.

At the end of eight minutes, the selector valves must be rotated an additional 20° to transmit the carrier gas into column 10 to elute the sample therein. This operation is controlled by cam 91 in exactly the same manner as previously described with respect to cam 90. At the end of five more minutes, the valve is again rotated by the operation of cam 92. The switch arms associated with cams 90, 91 and 92 are connected in parallel relationship so that each cam controls motor 103 in the manner previously described. The programmer thus operates to rotate selector valves 16 and 24.

As previously mentioned, the output signal from the bridge network which includes thermistors 19a and 27a is applied to a recorder 10. This recorder comprises a pen 120 which is displaced across a chart 121 by an amount representative of the output signal from the bridge network. Chart 120 is driven by a chart drive motor 122. One terminal of motor 122 is connected to power terminal 61, and the second terminal of motor 122 is connected to a switch 124 which engages a terminal 123 when relay coil 82 is energized. Terminal 123 is connected to power terminal 62. The fourth cam 93 on shaft 88 serves to energize a constant speed timing motor 125. The first terminal of motor 125 is connected to power terminal 62. The second terminal of motor 125 is connected to power terminal 61 when switch arm 93a engages a terminal 126. This occurs at approximately the same time as switch arm 91a engages terminal 91b, corresponding to the introduction of carrier gas into a column which previously was filled with sample material.

The drive shaft 128 of motor 125 is connected through a gear train 129 to rotate a shaft 130 at a preselected speed, such as one revolution per five minutes. Shaft 130 carries three cams 131, 132 and 133 which position respective switch arms 131a, 132a and 133a. Switch arm 131a is connected to terminal 126. Switch arm 131a rests in a depression in cam 131 at the beginning of the cycle, and shortly thereafter is raised to engage a terminal 132 which is connected to power terminal 61. This switch arm thus functions as a holding device to apply power to motor 125 until one revolution of shaft 130 is completed.

Switch arm 132a is connected to power terminal 61. This switch arm engages a terminal 134 shortly after rotation of shaft 130 begins. Terminal 134 is connected through relay coil 82 to power terminal 62. The engagement of terminal 134 by switch arm 132 thus energizes relay 82 to close switches 81 and 124. This energizes chart drive motor 122 and applies the output signal from the bridge network to recorder 80 for approximately one minute.

Switch arm 133a is connected to power terminal 61. This switch arm engages a terminal 135 when it is in its upper position and engages a terminal 136 when it is in its lower position. Terminal 135 is connected through the power coil 137 of a shaded-pole, reversible motor 138 to switch terminal 123. Cam 133 is designed so that switch arm 133a moves downwardly to engage terminal 136 after switch arm 132 has moved out of contact with terminal 134. Terminal 136 is connected directly to terminal 134 so that relay coil 82 again is energized when switch arm 133 moves downwardly. The center tap of the field coil 140 of motor 138 is connected to a switch 141 which is mechanically connected to recorder pen 120. The end terminals of coil 140 are connected to respective terminals 142 and 143 which are spaced on opposite sides of switch 141. The drive shaft of motor 138 is mechanically connected to the contactor of potentiometer 77.

During the first portion of the cycle established by motor 125, the bridge network is zeroed automatically. Switch 141 is mechanically connected to recorder pen 120 in such a manner that the switch arm remains between terminals 142 and 143 when the recording pen is at a position representing "zero" on chart 121. Motor 138 remains stationary at this time. If pen arm 120 is displaced from the zero point in a first direction, switch 141 is moved into contact with one of the terminals 142 and 143. This results in one half of field coil 140 being short circuited so that motor 138 rotates in a first direction. The resulting movement of the contactor of potentiometer 77 rebalances the bridge network to move pen arm 120 back to the zero point. If the pen arm is displaced initially in the opposite direction, the other half of motor coil 140 is short circuited so that the contactor of potentiometer 77 is moved in the opposite direction to rebalance the bridge. This operation occurs during the time that switch arm 132a engages terminal 134.

When switch arm 133a engages terminal 136, power is removed from motor winding 137 so that motor 138 remains stationary. Relay coil 82 remains energized so that the output signal from the bridge network is applied directly to recorder 80 to measure the composition of the effluent gas from the column through which the carrier gas is directed.

It is desirable that cells 19 and 27 and columns 10 to 15 be maintained at a relatively constant temperature. This can be accomplished by enclosing these elements within an insulated housing, not shown. A heating element 150 is disposed within this housing to supply sufficient heat to maintain a desired temperature. The application of electrical energy to heating element 150 is controlled by a thermostat 151. The first terminal of heating element 150 is connected to power terminal 61, and the second terminal thereof is connected to power terminal 62 through a switch 152 which is closed when a relay coil 153 is energized. The primary winding of a transformer 154 is connected between power terminal 61 and 62. The secondary winding of transformer 154 is connected across the filament of a thyratron 155. One terminal of the filament of thyratron 155, one of the grids thereof, and corresponding first terminals of the two windings of transformer 154 are connected to power terminal 61. The anode of thyratron 155 is connected to power terminal 62 through a resistor 153a and relay coil 153, the latter being shunted by a capacitor 156. The second terminal of the heating coil of thyratron 155 is connected to the first terminal of thermostat 151. The second terminal of thermostat 151 is connected through a resistor 158 to the control grid of thyratron 155 and through resistor 157 to power terminal 61. The second grid is connected directly to power terminal 61. As long as the temperature adjacent thermostat 151 is greater than a preselected value, the thermostat remains closed so that there is no conduction by thyratrons 155. Opening of the thermostat 151 results in the thyratron conducting to energize relay coil 153. This closes switch 152 to supply heating current to element 150. It should be evident, however, that other types of heating control can readily be incorporated to maintain a desired temperature.

From the foregoing description it should thus be evident that there is provided in accordance with this invention an improved fluid sample stream analysis instrument which is capable of performing a plurality of analyses in an automatic manner. A novel rotary valve is also provided to transmit fluid samples in a preselected manner.

While the invention has been described in conjunction with a present preferred embodiment, it should be evident that it is not limited thereto.

What is claimed is:

1. Apparatus for analyzing fluid mixtures comprising a plurality of columns filled with material which selectively retards passage therethrough of the constituents of a fluid mixture to be analyzed, first conduit means to introduce a fluid stream to be analyzed, second conduit means to introduce a carrier gas, third conduit means to introduce a purge gas, a first stationary plate, a second plate, means retaining the face of said first plate in engagement with the face of said second plate, a third stationary plate, a fourth plate, means retaining the face of said third plate in engagement with the face of said fourth plate, said first plate having a first passage therein which communicates between said first conduit means and a first point at the face of said first plate, said first plate having a plurality of second passages therein which communicate between respective first ends of said columns and respective second points at the face of said first plate, fourth conduit means extending between said first and third plates, said first plate having a third passage therein which communicates between said fourth conduit means and a third point at the face of said first plate, said first plate having a fourth passage therein which communicates between a fourth point exterior of said first plate and a fifth point at the face of said first plate, said first plate having a fifth passage therein which communicates between a sixth point exterior of said first plate and a seventh point at the face of said first plate, said third plate having a sixth passage therein which communicates between said third conduit means and an eighth point at the face of said third plate, said third plate having a plurality of seventh passages therein which communicate between respective second ends of said columns and respective ninth points at the face of said third plate, said third plate having an eighth passage therein which communicates between said fourth conduit means and said second conduit means, said third plate having a ninth passage therein which communicates between said fourth conduit means and a tenth point at the face of said third plate, said third plate having a tenth passage therein which communicates between an eleventh point exterior of said third plate and a twelfth point at the face of said third plate, said first to twelfth points being spaced from one another, means to rotate said second and fourth plates in unison so that the faces of said first and second plates remain in engagement with one another and the faces of said third and fourth plates remain in engagement with one another, said second plate having a first recess therein so that said first point is connected alternately to said seventh point and to said second points in sequence during said rotation, said second plate having a second recess therein so that said fifth point is connected to all of said second points except the one which is connected to said first point through said first recess, said first plate having a third recess therein so that said third point is connected to said second points in sequence during said rotation, said fourth plate having a fourth recess therein so that said eighth point is connected in sequence to all but one of said ninth points, said fourth plate having a fifth recess therein so that said tenth point is connected to said twelfth point alternately and to said ninth points in sequence, and means to measure a property of the effluent removed through said tenth passage which is representative of the composition of said effluent.

2. Apparatus for analyzing fluid mixtures comprising a plurality of columns filled with material which selectively retards passage therethrough of the constituents of a fluid mixture to be analyzed, first conduit means to introduce a fluid stream to be analyzed, second conduit means to introduce a carrier gas, third conduit means to introduce a purge gas, a first stationary plate, a second plate, means retaining the face of said first plate in engagement with the face of said second plate, a third stationary plate, a fourth plate, means retaining the face of said third plate in engagement with the face of said fourth plate, said first plate having a first passage therein which communicates between said first conduit means and a first point at the face of said first plate, said first plate having a plurality of second passages therein which communicate between respective first ends of said columns and respective second points at the face of said first plate, fourth conduit means extending between said first and third plates, said first plate having a third passage therein which communicates between said fourth conduit means and a third point at the face of said first plate, said first plate having a fourth passage therein which communicates between a fourth point exterior of said first plate and a fifth point at the face of said first plate, said first plate having a fifth passage therein which communicates between a sixth point exterior of said first plate and a seventh point at the face of said first plate, said third plate having a sixth passage therein which communicates between said third conduit means and an eighth point at the face of said third plate, said third plate having a plurality of seventh passages therein which communicate between respective second ends of said columns and respective ninth points at the face of said third plate, said third plate having an eighth passage therein which communicates between said fourth conduit means and said second conduit means, said third plate having a ninth passage therein which communicates between said fourth conduit means and a tenth point at the face of said third plate, said third plate having a tenth passage therein which communicates between an eleventh point exterior of said third plate and a twelfth point at the face of said third plate, said first to twelfth points being spaced from one another, means to rotate said second and fourth plates in unison so that the faces of said first and second plates remain in engagement with one another and the faces of said third and fourth plates remain in engagement with one another, said second and fourth plates having recesses therein which connect points adjacent said first and second plates, respectively, so that said first conduit means is connected to the first ends of said column in succession, said second conduit means is connected to the first ends of said columns in succession following said first conduit means being connected to said columns, and said third conduit means is connected to the second ends of said columns in succession after said second conduit means is connected to said columns, and means to measure a property of the effluent removed through said tenth passage which is representative of the composition of said effluent.

3. A rotary valve comprising a first stationary plate a second plate, means retaining the face of said first plate in engagement with the face of said second plate, a third stationary plate, a fourth plate, means retaining the face of said third plate in engagement with the face of said fourth plate, said first plate having a first passage therein which communicates between a first point exterior of said valve and a second point at the face of said first plate, said first plate having a plurality of second passages therein which communicates between respective third points exterior of said valve and respective fourth points at the face of said first plate, said first plate having a third passage therein which communicates between a fifth point exterior of said valve and a sixth point at the face of said first plate, said first plate having a fourth passage therein which communicates between a seventh point exterior of said valve and an eighth point at the face of said first plate, said first plate having a fifth passage therein which communicates between a ninth point exterior of said valve and a tenth point at the face of said first plate, said third plate having a sixth passage therein which communicates between an eleventh point exterior of said valve and a twelfth point at the face of said third plate, said third plate having a plurality of seventh passages therein which communicate between respective thirteenth points exterior of said valve and respective fourteenth points at the face of said third plate, said third plate having an eighth passage therein which communicates between a fifteenth point exterior of said valve and an eighteenth point at the face of said third plate, said third plate having a ninth passage therein which communicates between a seventeenth point exterior of said valve and an eighteenth point at the face of said third plate, said first to eighteenth point being spaced from one another, means to rotate said second and fourth plates in unison so that the faces of said first and second plates remain in engagement with one another and the faces of said third and fourth plates remain in engagement with one another, said second plate having a first recess therein so that said second point is connected alternately to said tenth point and to said third point in sequence during said rotation, said second plate having a second recess therein so that said eighth point is connected to all of said third points except the one which is connected to said second point through said first recess, said first plate having a third recess therein so that said sixth point is connected to said third points in sequence during said rotation, said fourth plate having a fourth recess therein so that said twelfth point is connected in sequence to all but one of said fourteenth points, and said fourth plate having a fifth recess therein so that said eighteenth point is connected to said sixteenth point alternately and to said fourteenth points in sequence.

4. The apparatus of claim 1 wherein said means to measure comprises a first thermal conductivity cell positioned in said eighth passage, a second thermal conductivity cell positioned in said tenth passage, and means to compare the outputs of said cells.

5. The apparatus of claim 1 wherein said first and third plates are positioned in spaced relationship so that the faces thereof face one another, said second and fourth plates are positioned between said first and third plates, and said means to rotate said second and fourth plates comprises a shaft connected to said second and fourth plates and resilient means urging said second plate into engagmeent with said first plate and urging said fourth plate into engagement with said third plate.

6. The apparatus of claim 1 wherein said means to rotate said second and fourth plates comprises a shaft connected to said second and fourth plates, a motor secured to said shaft, a source of electrical energy to energize said motor, and timing means to apply said source of energy to said motor at predetermined intervals to rotate said shaft.

7. The apparatus of claim 3 wherein said first and third plates are positioned in spaced relationship so that the faces thereof face one another, said second and fourth plates are positioned between said first and third plates, and said means to rotate said second and fourth plates comprises a shaft connected to said second and fourth plates and resilient means urging said second plate into engagement with said first plate and urging said fourth plate into engagement with said third plate.

References Cited in the file of this patent

UNITED STATES PATENTS

| | | |
|---|---|---|
| 2,721,578 | Pouppirt | Oct. 25, 1955 |
| 2,833,151 | Harvey | May 6, 1958 |

UNITED STATES PATENT OFFICE
CERTIFICATION OF CORRECTION

February 21, 1961

Patent No. 2,972,246

Marvin E. Reinecke et al.

It is hereby certified that error appears in the above numbered patent requiring correction and that the said Letters Patent should read as corrected below.

Column 8, lines 62 and 63, for "thereing" read -- therein --; column 10, line 17, for "eighteenth" read -- sixteenth --.

Signed and sealed this 25th day of July 1961.

(SEAL)
Attest:

ERNEST W. SWIDER
Attesting Officer

DAVID L. LADD
Commissioner of Patents